UNITED STATES PATENT OFFICE.

ARDON M. MITCHELL, OF TUCKAHOE, NEW YORK, ASSIGNOR OF ONE-HALF TO KATE M. WIDMER, OF TUCKAHOE, NEW YORK.

PROCESS OF MAKING FIREPROOF BUILDING MATERIAL.

1,408,760.   Specification of Letters Patent.   Patented Mar. 7, 1922.

No Drawing.   Application filed August 16, 1920.   Serial No. 403,774.

*To all whom it may concern:*

Be it known that I, ARDON M. MITCHELL, a citizen of the United States, residing at Tuckahoe, in the county of Westchester and State of New York, have invented certain new and useful Improvements in Processes of Making Fireproof Building Material, of which the following is a specification.

The present invention has reference to a process of making fire-proof building material, and it resides, essentially, first in the production of a composition block, board, or other form of body which shall possess to an extremely high degree all of the physical properties that render wood available in the arts, and in addition thereto the further properties of great tensile strength and proportionately low frangibility: of being unaffected by exposure to heat, cold or moisture, and of being readily molded: and second in the process by which such block, board, or other body is constructed.

A further object of the invention is to produce material of this type which has incorporated therewith aggregates or particles of any inorganic matter which possesses the property of filling the voids in the fibrous base, and which renders the product smooth, and possessed of ductile properties, and will adhere strongly to any surface to which it is applied such as iron, wood, or glass.

In carrying out this process, mineral wool prepared from furnace slag, asbestos, or any suitable material capable of being fused and blown into a fiber-like condition, is disintegrated into short fiber and is then incorporated with variable quantities of other inorganic aggregates, to fill the voids, rendering the surface of the mass smooth when it is pressed in a mould. These aggregates include material such as partly dehydrated sulphate of calcium or aluminum or magnesium in powder form intimately incorporated in the approximate proportion of one-half of one per cent to two per cent of the dehydrated salts. The mass is then deposited in a mold and saturated under pressure with sufficient sodium or potassium silicate to render the mass cohesive and yet retain its form on being withdrawn from the mold. The mass so treated is then immersed in a saturated solution of calcium chloride, which will at once react upon the soluble silicate. As a result of this reaction, calcium silicate is precipitated out, forming a superficial coating on the immersed mass. Dialysis then begins, the calcium chloride passing through the above mentioned coating and reacting on the colloid, i. e., the sodium or potassium, silicate, forming calcium silicate and sodium or potassium. This chloride passes out by exosmosis into the calcium chloride solution. The above reactions will have the effect of causing a cohesion of the neutral particles by crystalline cementation thereof.

The process above described is not restricted to the use of mineral wool, since in place thereof fullers' earth, said, ground glass, cinders, or other neutral absorbent infusorial earth material is pulverized form may be employed. Moreover, for imparting additional strength to the material in any of the cases specified, steel wool fiber may be introduced into the mass of absorbent material prior to its treatment with the re-agents. Portland cement may also be added when mineral wool is made use of.

It has been found from actual experiments that the steps of the process must be carried out in the order named, for if the mass of absorbent material be saturated with calcium chloride and then treated with a solution of sodium or potassium silicate, the first solution will be exosmosed into the second solution, forming a feathery precipitate and leaving the mass destitute of cohesion. Again, if the absorbent material and the two solutions be directly mixed together, then no cohesion will be obtained.

The material resultant from the process is in the nature of a concrete mass, the particles of which are cemented together by crystalline deposition. It may be nailed or otherwise fastened to other fastening devices with great tenacity, without being split or cracked thereby. It may be sawn, hewn or bored, subjected to great heat, and when heated, immersed in cold water without disintegrating. Its tenacity increases with age, and its tensile strength normally approximates that of marble, than which, however, it is much less frangible. Finally, it is unaffected by water, is nearly, as light as hard wood, and its surface may be readily smoothed and polished or otherwise decorated.

The addition of the dehydrated salts renders the colloidal solution more viscous, by depriving the sodium silicate of a portion of the water necessary for its solution, then reacting on it, resulting in cohesion of the mass by reason of a deposit of insoluble calcium silicate, and permitting subsequent treatment in a crystalloidal solution for the purpose of rendering the mass more coherent by crystalline cementation.

Further the salts impart to the product a property which permits of handling of same without danger of breakage or chipping, etc.

The term "aggregates" as herein employed should be considered to also cover salts that react slowly to form insoluble silicates such as fluroride of calcium, and carbonate of calcium, and also those aggregates that contribute color and refractory properties such as graphite and carborundum.

As a modification of the process above described, I may intimately mix with graphite, or infusorial earth, or mineral wool, a quantity of dry soluble sodium or potassium silicate with sufficient water to make the sodium or potassium silicate soluble. To the mass is then added dehydrating salts, the whole being then pressed in a mould, and afterwards sprayed with, or immersed in a crystalloidal solution, such as chloride of calcium.

What is claimed is:

The process for producing a fire-proof composition which consists in mixing steel wool fiber with a mass of disintegrated fibrous absorbent material, saturating the mixture with soluble silicate under pressure in a mold, and then immersing the saturated mass after having been withdrawn from the mold in a solution of calcium chloride, to set up dialysis and cause cementation of the mass by crystalline deposition within the same by the reaction of the calcium chloride upon the soluble silicate.

In testimony whereof I affix my signature.

ARDON M. MITCHELL.